United States Patent [19]

Kobayashi et al.

[11] Patent Number: 5,567,209

[45] Date of Patent: Oct. 22, 1996

[54] METHOD OF MANUFACTURING SOLID ELECTROLYTIC CAPACITOR

[75] Inventors: Atsushi Kobayashi; Satoshi Arai, both of Tokyo, Japan

[73] Assignee: NEC Corporation, Tokyo, Japan

[21] Appl. No.: 487,633

[22] Filed: Jun. 7, 1995

Related U.S. Application Data

[63] Continuation of Ser. No. 335,388, Nov. 3, 1994, abandoned.

[30] Foreign Application Priority Data

Nov. 4, 1993 [JP] Japan ..................... 5-275337

[51] Int. Cl.$^6$ ..................................... H01G 9/02
[52] U.S. Cl. .......................................... 29/25.03
[58] Field of Search ................. 29/25.03; 361/525, 361/529

[56] References Cited

U.S. PATENT DOCUMENTS

| | | |
|---|---|---|
| 4,803,596 | 2/1989 | Hellwig et al. . |
| 5,019,949 | 5/1991 | Ikedo et al. . |
| 5,140,502 | 8/1992 | Kudoh et al. . |
| 5,168,434 | 12/1992 | Kobayashi . |
| 5,187,649 | 2/1993 | Kudoh et al. . |
| 5,223,002 | 6/1993 | Ross ........................... 25/25.03 |
| 5,227,092 | 7/1993 | Han ............................. 252/500 |
| 5,315,474 | 5/1994 | Kuriyama . |

FOREIGN PATENT DOCUMENTS

| | | |
|---|---|---|
| 64-24410 | 1/1989 | Japan . |
| 2-74019 | 3/1990 | Japan . |
| 5-136007 | 6/1993 | Japan ....................... 361/525 |

*Primary Examiner*—George Fourson
*Assistant Examiner*—Thomas G. Bilodeau
*Attorney, Agent, or Firm*—Sughrue, Mion, Zinn, Macpeak & Seas

[57] ABSTRACT

The invention provides a method for manufacturing a solid electrolytic capacitor having oxide film of valve action metal as a dielectric substance and conducting polymer as solid electrolyte. The method includes the steps of forming solid monomer compound on a surface of the oxide film by applying monomer compound solution to the surface and then drying the monomer compound solution, and forming a conducting polymer layer by polymerizing the solid monomer compound with an oxidizer. The method provides a capacitor having a quite small impedance in a resonant frequency and also having a superior high frequency characteristic.

1 Claim, 2 Drawing Sheets

METHOD OF MANUFACTURING SOLID ELECTROLYTIC CAPACITOR

This is a continuation of U.S. patent application Ser. No. 08/335,388 filed Nov. 3, 1994, now abandoned.

BACKGROUND OF THE INVENTION

1. Field of the Invention

The invention relates to a method for manufacturing a solid electrolytic capacitor having conducting polymer as a solid electrolyte, and more particularly to a method for manufacturing such a solid electrolytic capacitor having a superior frequency characteristic.

2. Description of the Related Art

In general, a solid electrolytic capacitor includes a first electrode or an anode composed of a porous compact of valve action metal such as tantalum (Ta) and aluminum (Al), a dielectric substance composed of an oxide film of the anode, and a second electrode or a cathode composed of a solid electrolyte such as manganese dioxide ($MnO_2$) and 7,7,8,8-tetracyanoquinodimethane (TCNQ) complex salt. The solid electrolyte is required to have functions for electrically connecting an entire dielectric substance disposed in the porous compact to leads of the electrodes, and for repairing electrical short-circuit derived from defects of the dielectric oxide film. Accordingly, it is not allowed to use metal having high electrical conductivity but having no function for repairing an electrical short-circuit as a solid electrolyte. For instance, manganese dioxide ($MnO_2$), which can be converted to insulative material due to heat generated by short-circuit current, has been often used as a solid electrolyte.

However, a solid electrolytic capacitor having manganese dioxide ($MnO_2$) as a part of an electrode cannot have a sufficiently large electrical conductivity, and hence has to have a large impedance in the high frequency band. In addition, such a solid electrolytic capacitor can have only a poor thermal resistance, because TCNQ complex salt is easily thermally decomposed.

Recently, new materials have been developed in the field of high polymer. For instance, there has been developed a conducting polymer including conjugate high polymer such as polyacetylene, poly-p-phenylene, polypyrrole and polyaniline to which is added a dopant or an electron donative and/or electron attractive compound.

For instance, Japanese Unexamined Patent Public Disclosure No. 64-24410 has suggested a method for manufacturing a conducting polymer layer by introducing a monomer of a conducting polymer into a surface of an oxide film which plays a role of dielectric substance in liquid phase, and then adding thereto an oxidizer solution including an organic acid. On the conducting polymer layer are formed electrodes each composed of a graphite layer and a silver paste layer.

Japanese Unexamined Patent Public Disclosure No. 2-74019 has suggested a method of manufacturing a composite layer composed of a high polymer layer and a conducting polymer layer, including the steps of covering an oxide film with a high polymer film in which an oxidizer is distributed in advance, and contacting the oxide film with a monomer of the conducting polymer.

In the aforementioned method for manufacturing a solid electrolytic capacitor, suggested by Japanese Unexamined Patent Public Disclosure No. 64-24410, when the liquid monomer of the conducting polymer formed on the oxide film is made to contact with an oxidizer solution, the liquid monomer is diffused in the oxidizer solution. Hence, a required amount of conducting polymer cannot be produced. Thus, even if the method is applied to an existing capacitor which utilizes oxide film having a greatly enlarged surface, the capacitor can have disadvantageously only a low capacity attainment rate which is defined an actual capacitance value relative to a designed value.

On the other hand, in the method suggested by Japanese Unexamined Patent Public Disclosure No. 2-74019, since an oxidizer is in advance diffused in high polymer film, there would not occur a diffusion of the monomer into an oxidizer. However, the composite layer formed on the oxide film is composed of originally non-conducting polymer film and a conducting polymer, and hence the method has a problem that a resultant capacitor can have only quite a poor frequency characteristic.

SUMMARY OF THE INVENTION

In view of the foregoing problems of the conventional methods, it is an object of the present invention to provide a method for manufacturing a solid electrolytic capacitor, which method is capable of achieving a high capacity attainment rate even for a capacitor utilizing an oxide film having a greatly enlarged surface, and also capable of providing a superior frequency characteristic particularly in high frequency band.

The invention provides a method for manufacturing a solid electrolytic capacitor having an oxide film of valve action metal as a dielectric substance and conducting polymer as solid electrolyte, the method including the steps of forming a solid monomer compound on a surface of the oxide film by applying a monomer compound solution to the surface of the oxide film and then drying the monomer compound solution, and forming a conducting polymer layer by polymerizing the solid monomer compound with an oxidizer.

In a preferred embodiment, the monomer compound has a concentration in the solution of at least 1% by weight.

In another preferred embodiment, the method further includes the step of increasing a surface area of the valve action metal prior to forming the solid monomer compound on the surface of the valve action metal.

In still another preferred embodiment, the surface area of the valve action metal is increased by forming a mass of irregularities on the surface of the valve action metal, i.e., by roughening this surface.

In yet another preferred embodiment, the oxide film is formed by means of anodic oxidation.

In still yet another preferred embodiment, the oxide film is formed over the irregularities by means of anodic oxidation.

In a further preferred embodiment, the conducting polymer layer is formed so that the layer deeply penetrates the irregularities i.e., covers the crevices and tops of the irregularities forming the roughened surface.

In a further preferred embodiment, the method further includes the step of forming a cathode on the conducting polymer layer oppositely to the solid monomer compound.

In a further preferred embodiment, the method further includes the step of forming a carbon layer between the conducting polymer layer and the cathode.

In a further preferred embodiment, the carbon layer is a graphite layer.

In a further preferred embodiment, the method further includes the step of sealing the resultant with epoxy resin.

The invention further provides a method for manufacturing a solid electrolytic capacitor having an oxide film of valve action metal as a dielectric substance and a conducting polymer as a solid electrolyte, the method including the steps of anodizing a pellet composed of sintered tantalum powder, drying the anodized pellet, immersing the pellet in an aniline salt solution, drying again the pellet, immersing the pellet in an oxidant solution, polymerizing the pellet to form oxide film composed of polyaniline on the oxide film, immersing the pellet in an acid solution and then drying, and repeating third to seventh steps in a desired number of times.

In a preferred embodiment, the method further includes the step of applying carbon paste to the resultant subsequently to the step of repeating third to seventh steps.

In another preferred embodiment, the method further includes the step of applying silver paste to the resultant subsequently to the step of applying carbon paste.

The advantages obtained by the aforementioned present invention will be described hereinbelow.

The invention provides advantages that a capacitor having a greatly enlarged surface can be manufactured, for instance, by forming a mass of irregularities on a surface of a conducting polymer layer (i.e., by roughening the surface), and that a solid electrolytic capacitor having a superior high frequency characteristic can be easily manufactured. Compared to a conventional method in which liquid monomer is merely polymerized with an oxidizer on an oxide film, the method in accordance with the invention has advantages over the conventional method that the method can manufacture a capacitor having a high capacity attainment rate even from a capacitor having an enlarged surface. Compared to a conventional method in which an insulative high polymer containing oxidizer is formed on an oxide film and then a conducting polymer is formed, the method in accordance with the invention forms a conducting polymer, which has a high electrical conductivity, directly on the oxide film, and hence the invention provides advantages over the conventional method that the invention provides a capacitor having a quite small impedance at resonant frequency and also having a superior high frequency characteristic.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

Figure 1:
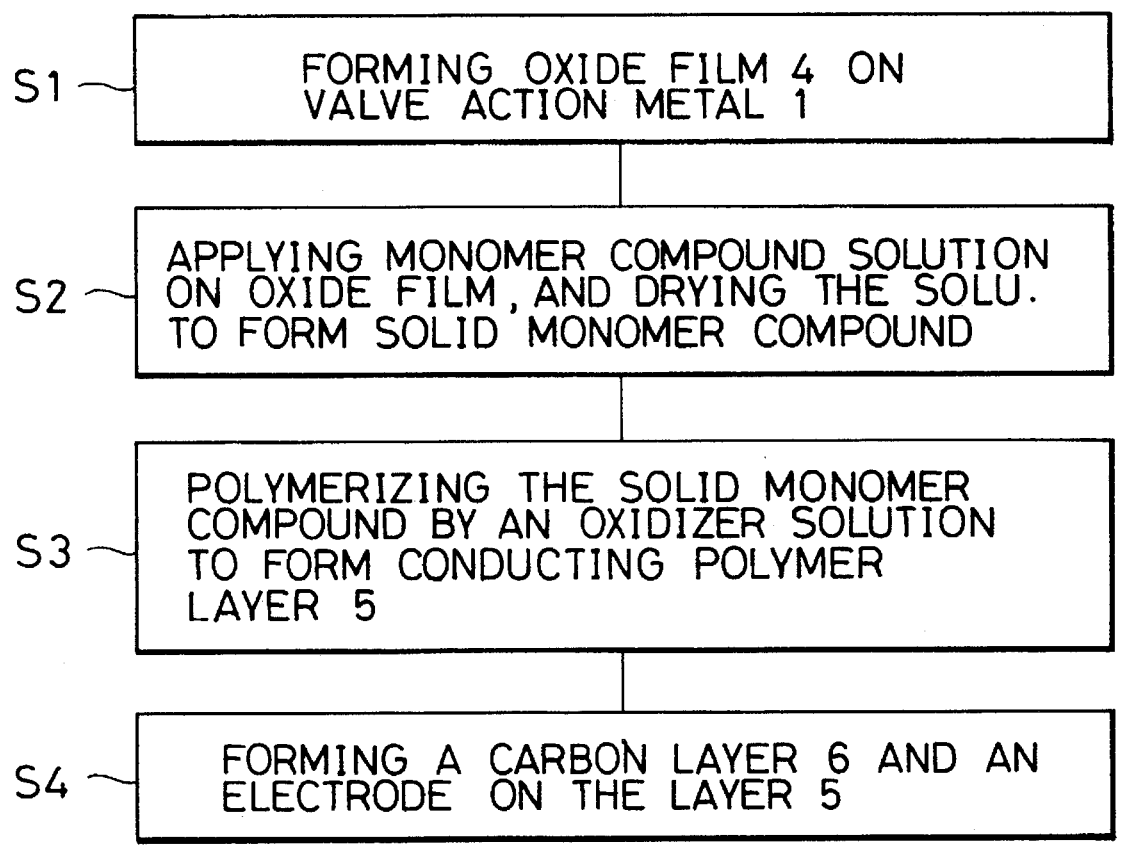
FIG. 1 is a flow chart showing the steps of the method in accordance with the invention.

With reference to FIG. 1, the method for manufacturing a solid electrolytic capacitor in accordance with the invention will be explained hereinbelow. First, in step 1, a mass of irregularities 2 are formed on a surface 1a of valve action metal 1 which will operate as an anode, as illustrated in a partially enlarged figure included in FIG. 2, in order to increase the surface area of the surface 1a of the valve action metal 1. Then, an oxide film 4 operating as a dielectric substance is formed by means of anodic oxidation over the surface 1a of the valve action metal 1 on which the irregularities 2 are formed.

Then, in step 2, a monomer compound solution is applied to a surface of the oxide film 4. Then, the monomer compound solution is solidified by drying so that solid electrolyte 5 composed of the solidified monomer compound solution and operating as a conducting polymer layer cavers the concave portions 2a of the irregularities 2.

In step 3, the conducting polymer layer 5 is polymerized with oxidizer solution to thereby form a chemically oxidized, polymerized, conducting polymer film.

Figure 2:
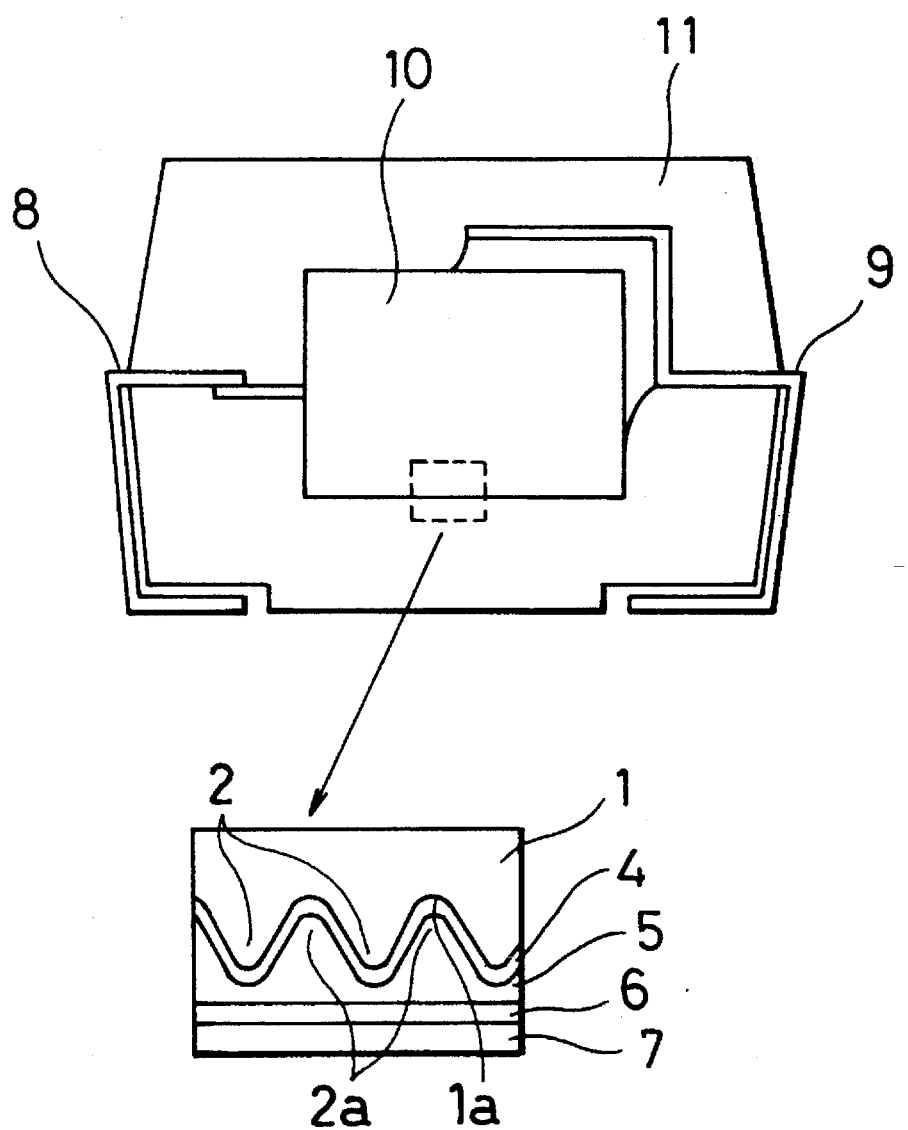
FIG. 2 is a schematic cross-sectional view of a solid electrolytic capacitor manufactured in accordance with the embodiment of the invention.

In step 4, a metal electrode 7 operating as a cathode is attached to the conducting polymer layer 5. Between the cathode 7 and the conducting polymer layer 5 may be disposed a carbon layer or a graphite layer 6 for maintaining an appropriate contact of the cathode 7 with the layer 5. Then, as illustrated in FIG. 2, a pair of electrode leads 8 and 9 are formed protruding from the thus manufactured resultant 10. Finally, around the resultant 10 having the electrode leads 8 and 9 protruding therefrom is surrounded by epoxy resin 11. Thus, a solid electrolytic capacitor is manufactured.

SAMPLE 1

A pellet composed of sintered tantalum (Ta) fine powder and shaped in rectangular parallelopiped having 1 mm of length, 1 mm of width and 1 mm of thickness, and having 30,000/g of a CV product value which is defined as a product of capacitance µF per 1 gram and an anodic oxidation voltage V, was anodic-oxidized with a voltage of 48 V in a solution containing 0.1% by weight of phosphoric acid. Then, the pellet was washed and dried. Then, there was prepared aniline salt solution by mixing a solvent containing 70% by weight of ethanol and 30% by weight of water with aniline and p-toluenesulfonic acid equal to aniline in an amount in tool so that the aniline and p-toluenesulfonic acid occupy 15% by weight on the basis of a weight of the solvent. Then, the sintered pellet was soaked in the aniline solution for 30 seconds while the pellet was maintained at 0 degree of temperature, and subsequently the pellet was stood for 10 minutes at a room temperature. As a result, aniline salt in solid was precipitated on a surface and inside of the sintered pellet.

Then, the sintered pellet was soaked for 30 seconds at 0 degree of temperature in a solution containing 5% by weight of ammonium dichromate and 40% by weight of p-toluenesulfonic acid, and subsequently was stood for 30 minutes at a room temperature. Thus, the polymerization was achieved and hence black-colored polyaniline was formed on a surface of oxide film. Furthermore, the pellet was soaked for 5 minutes in an acidic solution containing p-toluenesulfonic acid by 7% by weight diluted with a solvent containing 50% by weight of ethanol and 50% by weight of water, and then was stood for 30 minutes at a room temperature.

The steps of soaking the pellet in the aniline salt solution, soaking the pellet in the oxidizer solution, achieving the polymerization, and soaking the pellet in the acidic solution were repeated six times. Then, to the resultant was applied carbon paste commercially available from Acheson Industries, inc. under the trade name of "Electrodug 112" and silver paste commercially available from Fujikura Kasei Corporation under the trade name of "Dotite D-550". Then, cathode leads were attached to the resultant and the resultant was entirely covered with epoxy resin. Thus, a solid electrolytic capacitor was completed.

SAMPLE 2

A pellet composed of sintered tantalum (Ta) fine powder and cylindrically shaped having 1 mm of diameter and 1 mm of height, and having 27,000/g of a CV product value was anodic-oxidized with a voltage of 13 V in a solution containing 0.1% by weight of phosphoric acid. Then, the pellet was washed and dried. Then, there was prepared aniline salt solution by mixing a solvent containing 70% by weight of methanol and 30% by weight of water with aniline and p-toluenesulfonic acid equal to aniline in an amount in mol so that the aniline and p-toluenesulfonic acid occupy 15% by weight on the basis of a weight of the solvent. Then, the sintered pellet was soaked in the aniline solution for 30 seconds while the pellet was maintained at 0 degree of temperature, and subsequently the pellet was stood for 10 minutes at a room temperature. As a result, aniline salt in solid was precipitated on a surface and inside of the sintered pellet.

Then, the sintered pellet was soaked for 30 seconds at 0 degree of temperature in a solution containing 15% by weight of ammonium peroxodisulfate and 15% by weight of p-toluenesulfonic acid, and subsequently was stood for 30 minutes at a room temperature. Thus, the polymerization was achieved and hence black-colored polyaniline was formed on a surface of oxide film. In accordance with the same fashions as those of the sample 1 except the aforementioned ones, a solid electrolytic capacitor was manufactured.

SAMPLE 3

In sample 3 was used a pellet identical to that used in sample 2. There was prepared aniline salt solution by mixing a solvent containing 70% by weight of ethanol and 30% by weight of water with aniline and benzenesulfonic acid equal to aniline in an amount in mol so that the aniline and benzenesulfonic acid occupy 15% by weight on the basis of a weight of the solvent. Then, the sintered pellet was soaked in the aniline solution for 30 seconds while the pellet was maintained at 0 degree of temperature, and subsequently the pellet was stood for 10 minutes at a room temperature. As a result, aniline salt in solid was precipitated on a surface and inside of the sintered pellet.

Then, the polymerization of aniline was achieved in the same way as that of sample 1. Then, leads were attached to the resultant to thereby complete a solid electrolytic capacitor. The number of polymerization steps for obtaining sufficient thickness was six (6).

COMPARATIVE SAMPLE 1

In comparative sample 1 was used a pellet composed of sintered tantalum (Ta) fine powder and shaped in rectangular parallelopiped having 1 mm of length, 1 mm of width and 1 mm of thickness, namely, identical to that used in sample 1. There was prepared aniline solution by mixing a solvent containing 70% by weight of ethanol and 30% by weight of water with aniline so that the aniline occupies 15% by weight on the basis of a weight of the solvent. Then, the sintered pellet was soaked in the aniline solution for 30 seconds while the pellet was maintained at 0 degree of temperature, and subsequently the pellet was stood for 10 minutes at a room temperature. However, unlike sample 1, there was not precipitated aniline salt in solid on a surface and inside of the sintered pellet.

Then, the polymerization of aniline was achieved in the same way as that of sample 1. Then, leads were attached to the resultant to thereby complete a solid electrolytic capacitor. The number of polymerization steps for obtaining sufficient thickness was fifty (50).

COMPARATIVE SAMPLE 2

In comparative sample 2 was used a pellet composed of sintered tantalum (Ta) fine powder and shaped in rectangular parallelopiped having 1 mm of length, 1 mm of width and 1 mm of thickness, namely, identical to that used in sample 1. There was prepared aniline salt solution by mixing a solvent containing 70% by weight of ethanol and 30% by weight of water with aniline and p-toluenesulfonic acid equal to aniline in an amount in mol so that the aniline and p-toluenesulfonic acid occupy 0.8% by weight on the basis of a weight of the solvent. Then, the sintered pellet was soaked in the aniline solution for 30 seconds while the pellet was maintained at 0 degree of temperature, and subsequently the pellet was stood for 10 minutes at a room temperature. As a result, quite a small amount of aniline salt in solid was precipitated on a surface and inside of the sintered pellet.

Then, the polymerization of aniline was achieved in the same way as that of sample 1. Then, leads were attached to a resultant to thereby complete a solid electrolytic capacitor. The number of polymerization for obtaining sufficient thickness was fifty (50).

Table 1 shows CV product values, a mixture rate by weight of the monomer solution, the concentration of monomer relative to a weight of solvent, the number of polymerization, the obtained capacitor attainment rate $C/C_0$ wherein $C_0$ indicates a capacity in electrolytic solution, leak current (LC), and a resonant frequency impedance (Z) each obtained in samples 1 to 3 and comparative samples 1 and 2.

TABLE 1

|  | CV Value [/g] | Monomer Solution (Mix. Rate) | Monomer Concentration (%) | Number of Polymerization | $C/C_0$ (%) | LC (nA) | Z (mΩ) |
|---|---|---|---|---|---|---|---|
| SAMPLE 1 | 30,000 | Ethanol/Water (70/30) | 15 | 6 | 96 | 5.8 | 115 |
| SAMPLE 2 | 27,000 | Methanol/Water (70/30) | 15 | 6 | 95 | 13 | 106 |
| SAMPLE 3 | 27,000 | Ethanol/Water (70/30) | 15 | 6 | 96 | 10 | 125 |
| COMPA. 1 | 30,000 | Ethanol/Water (70/30) | 15 | 50 | 49 | 68 | 118 |
| COMPA. 2 | 30,000 | Ethanol/Water (70/30) | 0.8 | 40 | 39 | 55 | 145 |

The table 1 shows that a solid electrolytic capacitor in accordance with the invention provides a large capacitor attainment rate even applied to a capacitor element having a greatly enlarged surface, and has only a small impedance at resonant frequency together with a superior high frequency characteristic.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method for manufacturing a solid electrolytic capacitor having an oxide film of valve action metal as a dielectric substance and polyaniline as a solid electrolyte, said method comprising the steps of:

(a) anodizing a pellet composed of sintered tantalum powder to form said oxide film of said valve action metal on a surface thereof;

(b) drying said anodized pellet;

(c) immersing said pellet in an aniline p-toluenesulfonate solution to precipitate a solid aniline p-toluensulfonate on said surface of and inside of said pellet; then (d) drying said pellet at room temperature;

(e) immersing said pellet precipitated with said solid aniline p-toluenesulfonate in an oxidant solution, and drying said pellet to polymerize aniline on said surface of and inside of said pellet to form a pollyaniline layer on said surface of and inside of said pellet;

(f) immersing said pellet having said polyaniline layer in an acid solution and then drying said pellet at room temperature; and (g) repeating steps (c) to (f) a number of times.

* * * * *